United States Patent
Tago

(10) Patent No.: US 12,085,748 B2
(45) Date of Patent: Sep. 10, 2024

(54) DISPLAY APPARATUS

(71) Applicant: Japan Display Inc., Tokyo (JP)

(72) Inventor: Keiji Tago, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/498,098

(22) Filed: Oct. 31, 2023

(65) Prior Publication Data

US 2024/0151894 A1    May 9, 2024

(30) Foreign Application Priority Data

Nov. 9, 2022   (JP) ................. 2022-179752

(51) Int. Cl.
| | | |
|---|---|---|
| *F21V 8/00* | (2006.01) | |
| *G02B 27/01* | (2006.01) | |
| *G02F 1/13357* | (2006.01) | |

(52) U.S. Cl.
CPC ....... *G02B 6/0068* (2013.01); *G02B 27/0172* (2013.01); *G02F 1/1336* (2013.01); *G02F 2203/01* (2013.01)

(58) Field of Classification Search
None
See application file for complete search history.

(56) References Cited

U.S. PATENT DOCUMENTS

2016/0306100 A1* 10/2016 Chen ................... G02B 6/0026
2019/0302343 A1* 10/2019 Okuyama ............ G02B 6/0046

FOREIGN PATENT DOCUMENTS

| CN | 102121606 A | * 7/2011 | ............. A61K 38/05 |
| JP | 2020-101684 A | 7/2020 | |

\* cited by examiner

*Primary Examiner* — Phu Vu
(74) *Attorney, Agent, or Firm* — Michael Best & Friedrich LLP

(57) ABSTRACT

A display apparatus includes: a first substrate having a first front surface and a first back surface that is an opposite surface of the first front surface; a liquid crystal layer arranged on the first front surface of the first substrate; a light guide plate having a first main surface facing the first front surface, a second main surface that is an opposite surface of the first main surface and a side surface crossing the first main surface and the second main surface; and a light source unit including a plurality of light emitting elements arranged along a first direction at a position facing the side surface of the light guide plate, and a light emitting surface of the light source unit is arranged to have a different direction from a direction of the side surface of the light guide plate in a thickness direction of the light guide plate.

9 Claims, 8 Drawing Sheets

DISPLAY APPARATUS

CROSS-REFERENCE TO RELATED APPLICATION

The present application claims priority to Japanese Patent Application No. 2022-179752 filed on Nov. 9, 2022, the disclosure of which is incorporated herein by reference.

TECHNICAL FIELD

The present invention relates to a display apparatus including a light guide plate.

BACKGROUND ART

A transparent display apparatus is known as a display apparatus including a liquid crystal layer, the transparent display apparatus including a side surface of a transparent substrate arranged to face a light emitting element, and guiding light emitted from the light emitting element to make the light incident into the transparent substrate. For example, Japanese Patent Application Laid-Open Publication No. 2020-101684 (Patent Document 1) discloses a display apparatus configured to include a light emitting element and a second transparent substrate having a side surface facing the light emitting element, in which decrease in display quality is suppressed by increasing surface roughness of the side surface to reflect light emitted from the light emitting element to suppress decrease in luminance.

RELATED ART DOCUMENT

Patent Document

Patent Document 1: Japanese Patent Application Laid-Open Publication No. 2020-101684

SUMMARY OF THE INVENTION

Problems to be Solved by the Invention

The inventors of the present application have developed a transparent display apparatus allowing an observer to recognize a display image and a background while overlapping them. In the case of the transparent display apparatus, each of a front surface and a back surface needs to have a property that transmits visible light. Therefore, a light source unit for displaying an image is arranged on a side surface of a light guide plate. Light emitted from the light source unit is made incident on the side surface of the light guide plate, is diffused in a liquid crystal layer while scattering inside a liquid crystal panel, and emits out of the liquid crystal panel, and then, the observer can recognize the image when perceiving the emitted light.

Incidentally, in recent years, it is general to use a light emitting diode element (LED) as a light source configuring the light source unit, and the LED has high light condensing property for the incident light, and is preferable in terms of securement of the luminance. However, a dark line with low lightness or a bright line with high lightness is occasionally formed near an incident-light portion of the light guide plate.

Accordingly, an objective of the present invention is to provide a display apparatus capable of suppressing the formation of the dark line and the bright line near the incident-light portion as described above.

Means for Solving the Problems

A display apparatus according to one embodiment of the present invention includes: a first substrate having a first front surface and a first back surface that is an opposite surface of the first front surface; a liquid crystal layer arranged on the first front surface of the first substrate; a light guide plate having a first main surface facing the first front surface, a second main surface that is an opposite surface of the first main surface and a side surface crossing the first main surface and the second main surface; and a light source unit including a plurality of light emitting elements arranged along a first direction at a position facing the side surface of the light guide plate, and a light emitting surface of the light source unit is arranged to have a different direction from a direction of the side surface of the light guide plate in a thickness direction of the light guide plate.

BRIEF DESCRIPTIONS OF THE DRAWINGS

BEST MODE FOR CARRYING OUT THE INVENTION

Figure 1:
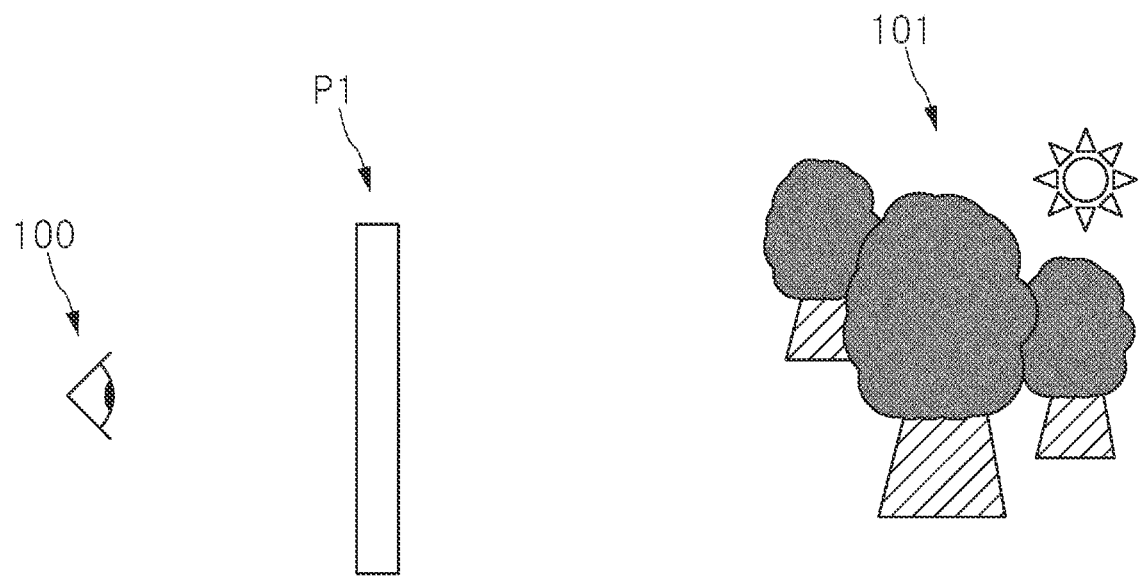
FIG. 1 is an explanatory diagram showing positional relation provided when an observer on one surface side of a transparent display panel apparatus visually recognizes a background on the opposite surface side through the transparent display panel apparatus.

Hereinafter, each embodiment of the present invention will be described with reference to the accompanying drawings. Note that only one example is disclosed, and appropriate modification with keeping the idea of the present invention which can be anticipated by those who are skilled in the art is obviously within the scope of the present invention. Also, in order to make the explanation clearer, a width, a thickness, a shape, and others of each portion in the drawings are schematically illustrated more than those in an actual aspect in some cases. However, the illustration is only an example, and does not limit the interpretation of the present invention. In the present specification and each drawing, similar elements to those described earlier for the already-described drawings are denoted with the same or similar reference characters, and detailed explanation for them is appropriately omitted in some cases.

[Studied Matters]

Figure 10:
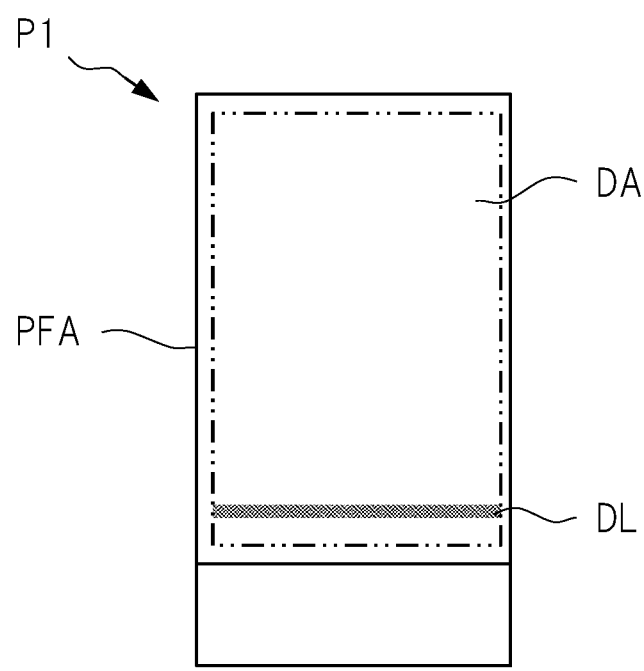
FIG. 10 is a diagram showing one example of a dark line formed in a display region in a study example.

Before explanation for the present embodiments, previously-studied matters will be explained below. As described above, generally, in the transparent display apparatus, the dark line or the bright line is occasionally formed near the incident-light portion of the light guide plate. For example, FIG. 10 shows an image diagram showing that the dark line DL is formed in the display region DA of the display panel P1 including the display region DA and a peripheral region PFA. In order to suppress such formation of the dark line or the bright line, countermeasures to scatter/diffuse the incident light by arranging a convex portion or a concave portion on a side surface of the light guide plate as described in the Patent Document 1 are considerable.

The present inventors have studied a cause of the formation of the dark line or the bright line in more detail. From the studies based on simulation for angle distribution of the incident light in a thickness direction of the side surface of the light guide plate at the time of the general light incidence on the side surface of light guide plate from the light source unit, it has been found out that the angle distribution of the light is instable near the incident-light portion of the light guide plate.

Figure 11:
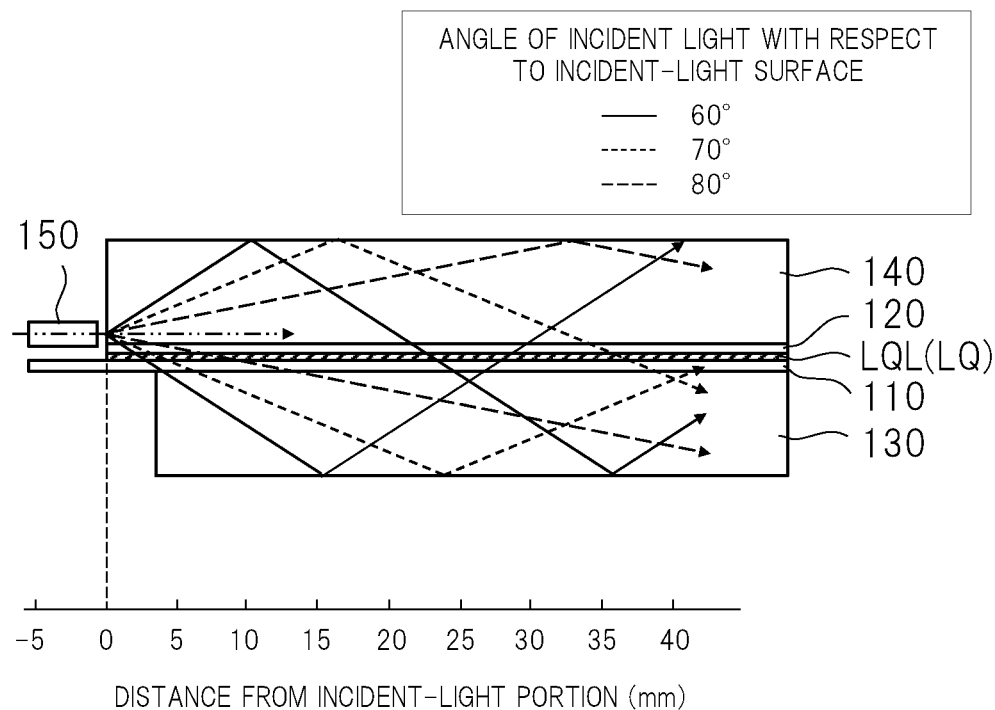
FIG. 11 is a model diagram showing one example of a propagation state of the incident light near an incident-light portion on the light guide plate from the LED in a study example.

A result of the simulation will be explained with reference to FIGS. 11 and 12. FIG. 11 is a model diagram for explaining a configuration in side view of a display panel used for the simulation and the incident light passing through the display panel. The display panel used in this case is configured so that a liquid crystal layer LQL is sandwiched by a substrate (array substrate) 110 and a counter substrate 120 and so that cover glasses 130 and 140 are stacked on outside of the substrate 110 and the counter substrate 120. A light source unit 150 is arranged to make the light-source light incident on the cover glass 140 that becomes the light guide plate. This display panel has a related-art general arrangement in which the light emitting element of this light source unit 150 is normally arrayed so that a light emitting surface of the light emitting element and a side surface of the cover glass 140 facing the light emitting surface are in parallel to each other.

In this case, as a premise, conditions for the configuration of the display panel have been set so that a substrate having a thickness of 0.7 mm is used as the substrate 110, a substrate having a thickness of 0.7 mm is used as the counter substrate 120, a substrate having a thickness of 6.5 mm is used as the cover glass 130, and a substrate having a thickness of 6.5 mm is used as the cover glass 140, so that gaps among these substrates are filled with liquid crystal having a thickness of 3 μm as the liquid crystal layer, and so that the side surface of the cover glass 140 is provided with a light emitting diode (LED) capable of emitting light therein.

Figure 12:
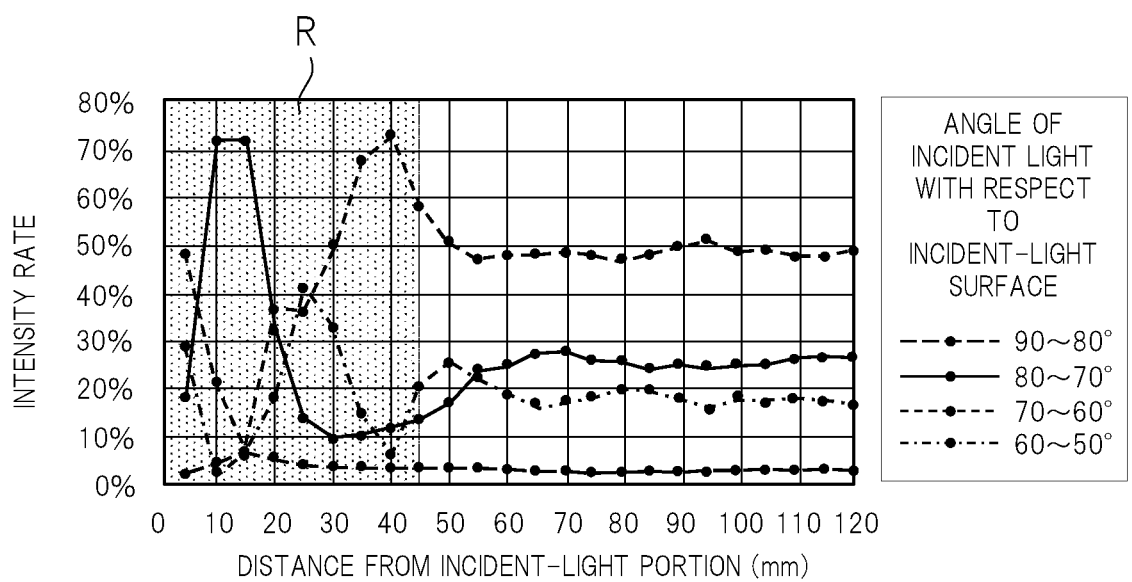
FIG. 12 is a graph showing the angle distribution of incident light on the light guide plate from the LED in the study example.

The result of the simulation for the angle distribution of the incident light (that is an intensity rate at an incident angle) in such an arrangement example is shown in FIG. 12. Note that FIG. 11 shows an example regarding the incident light having three incident angles that are 60°, 70° and 80° on an incident-light surface in the thickness direction of the display panel.

From the result shown in FIG. 12, it can be understood that the angle distribution of the light having the incident angle of 60 to 90 degrees propagating mainly through the light guide plate is instable and biased in a region R (between, for example, the incident-light portion and a position distant from the incident-light portion by a distance of 45 mm) near the incident-light portion of the light guide plate on which the light is made incident. Meanwhile, an intensity rate of light having an incident angle of 50 degrees or less is small to be 5% or smaller even in the position near the incident-light portion, and therefore, description for this will be omitted. Accordingly, the present inventors have diligently studied a method of solving the biased angle distribution near the incident-light portion as described above, and, as a result, have found out that the biased angle distribution can be solved by a predetermined configuration of arrangement of the light source in the thickness direction of the display panel even without the concave portion or the convex portion on the side surface of the light guide plate, and have completed the present invention.

[Display Apparatus]

Figure 2:
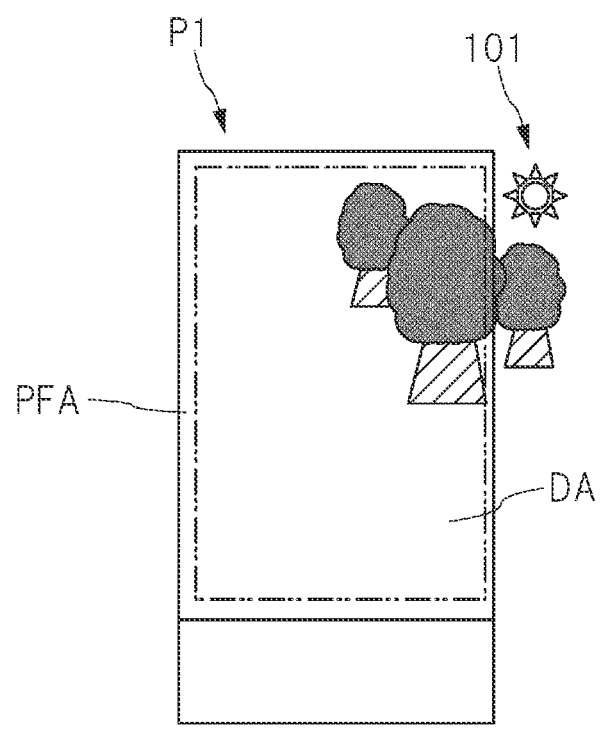
FIG. 2 is an explanatory diagram showing one example of the background visually recognized through the transparent display panel apparatus.

The display apparatus of the present embodiment is a transparent display apparatus, and a general configuration of this display apparatus will be explained first. FIG. 1 is an explanatory diagram showing positional relation provided when an observer on one surface side of the display panel P1 visually recognizes the background on the opposite surface side through the display panel P1. FIG. 2 is an explanatory diagram showing one example of the background visually recognized through the display panel P1.

As shown in FIG. 1, when viewing the other side of the display panel P1 from one side of the same, the observer 100 visually recognizes the background 101 through the display panel P1. If both the display region DA and the peripheral region PFA outside the display region DA have the visible-light transmission as shown in FIG. 2, this case is preferable since the entire background 101 can be visually recognized without uncomfortable feeling. Note that there is no problem even if the peripheral region PFA does not have the visible-light transmission. A border between the display region DA and the peripheral region PFA in this case is illustrated with a dashed double-dotted line.

The display panel P1 used in this case includes a transparent glass plate, and only needs to be a transparent display panel capable of displaying the image while transmitting the background to be visually recognizable, and therefore, a publicly-known transparent display panel can be used without limitation. As this transparent display panel, for example, a liquid crystal display panel or others is exemplified. This display panel P1 is of a type including a liquid crystal layer transmitting/scattering the light-source light incident on the liquid crystal layer through the light guide plate or external light incident on the liquid crystal layer, and the light source is not on a substrate plane.

In the present embodiment, the following explanation will be made as an example in a case of usage of, as the display panel P1, the transparent display panel (liquid crystal display panel) that displays the image while using the scattering of the visible light due to the liquid crystal molecules.

In this case, the liquid crystal display panel is an apparatus that forms the display image by changing orientation of the molecules contained in the liquid crystal layer, and needs the light source. An aspect including the light source on side of the display panel including the liquid crystal layer will be explained as an example below.

<Display Panel>

Figure 3:
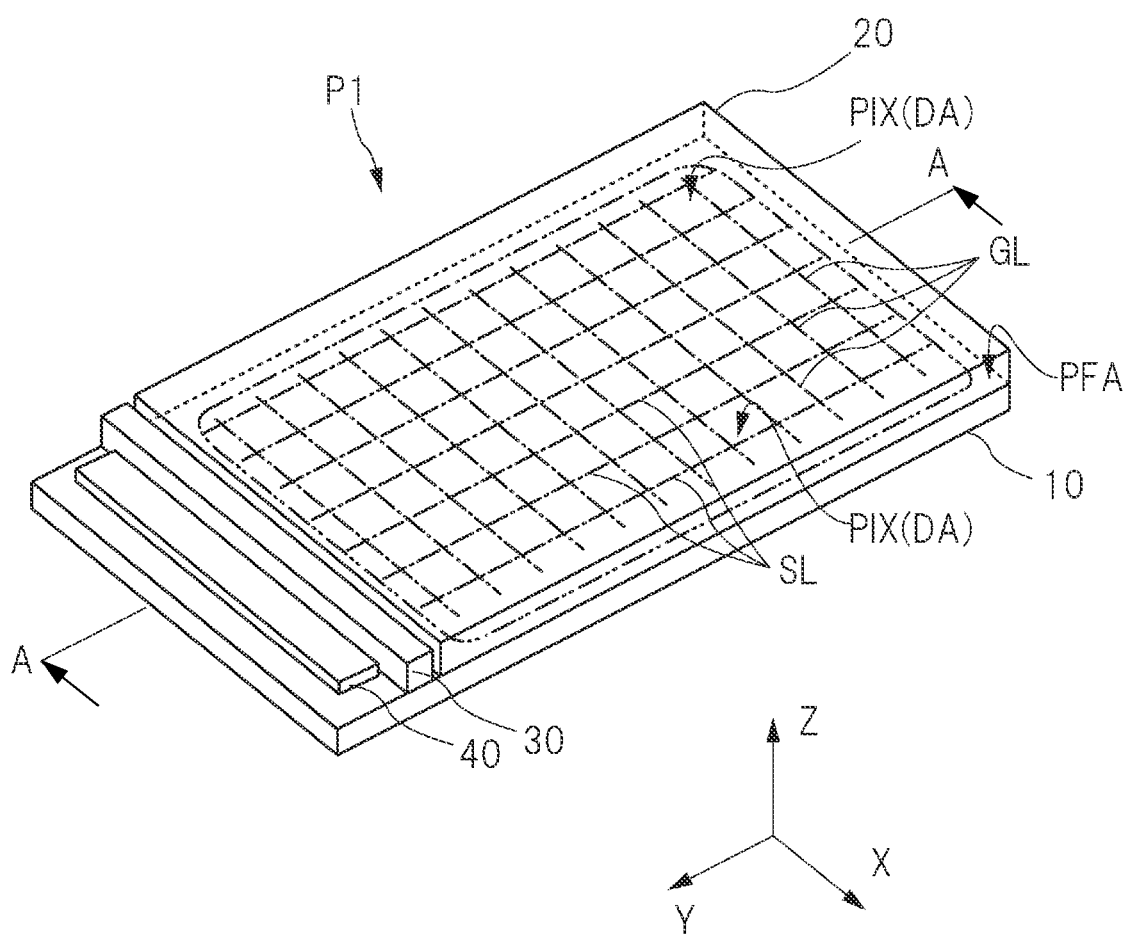
FIG. 3 is a perspective view showing one example of a general configuration of a transparent display panel shown in FIG. 1.

First, a configuration of the display panel will be explained. FIG. 3 is a perspective view showing one example of the display panel P1 used in the present embodiment.

Figure 4:
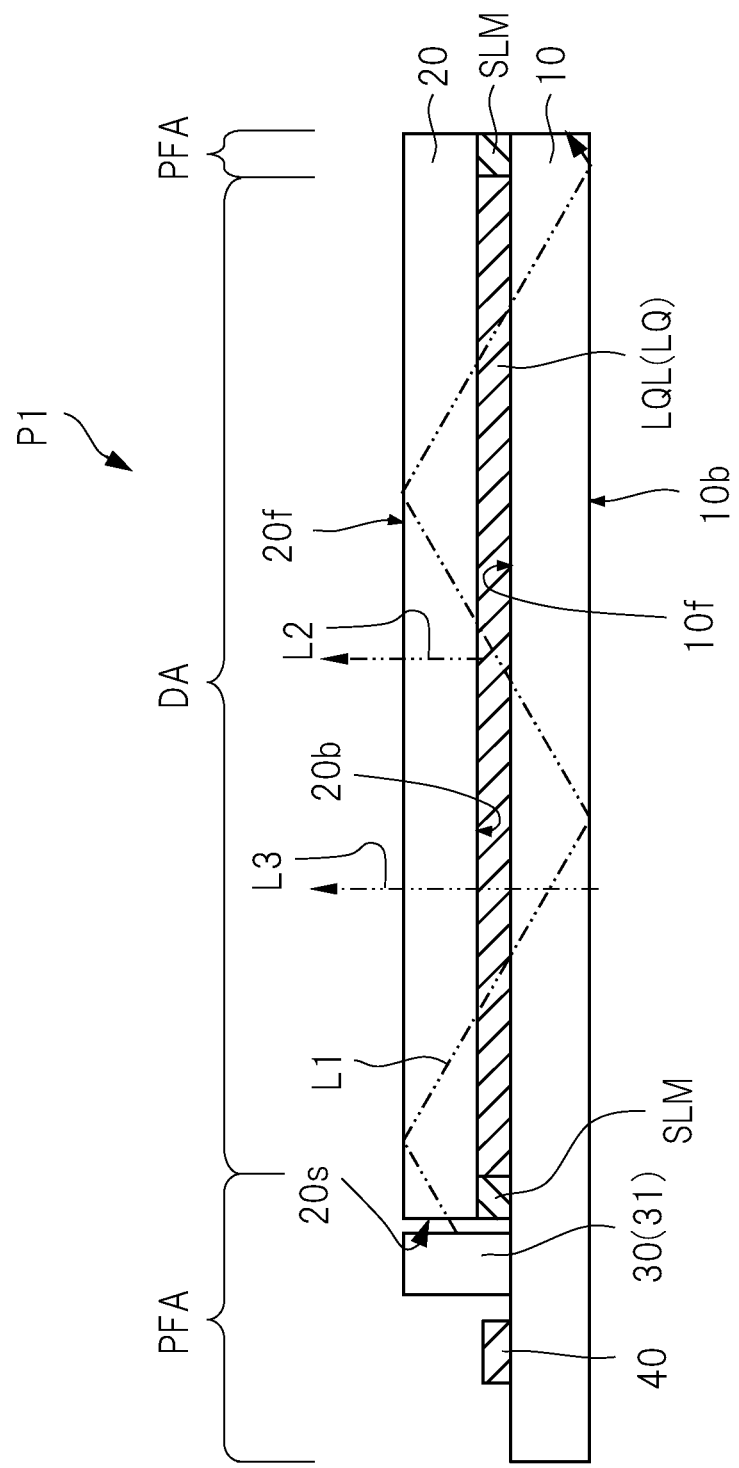
FIG. 4 is a cross-sectional view taken along a line A-A of FIG. 3.

In FIG. 3, some (more specifically a gate line GL and a source line SL) of signal wirings for transmitting a signal for driving the liquid crystal in a circuit included in the display panel P1 are schematically illustrated with a dashed dotted line. The following diagrams including FIG. 3 will be explained so that a direction along the thickness direction of the display panel P1 is defined as a Z direction, an extending direction of one side of the display panel P1 on an X-Y plane perpendicular to the Z direction is defined as an X direction, and a direction crossing the X direction is defined as a Y direction. FIG. 4 is a cross-sectional view taken along a line A-A of FIG. 3.

As shown in FIG. 3, the display panel P1 of the present embodiment includes a substrate (array substrate) 10, a light guide plate (counter substrate) 20, a side light source apparatus and a driver circuit 40. The display panel P1 occasionally includes, for example, a control circuit, a flexible substrate connected to the display panel P1, a housing or others in addition to each component of the display panel P1 shown in FIG. 3. In FIG. 3, illustration of parts other than the display panel P1 is omitted. In the display panel P1, images are formed in the display region DA in response to input signals supplied from outside.

Note that the display region DA of the display panel P1 shown in FIG. 3 has a quadrangular shape. However, the display region may not have the quadrangular shape but a shape such as a polygonal shape, a circular shape or others. In plan view in which a display surface is viewed, the display region DA is an effective region where the display panel P1 displays the images. Each of the substrate 10 and the light guide plate 20 is at a position overlapping the display region DA in plan view. Each of the side light source apparatus 30 and the driver circuit 40 is mounted on the substrate 10.

As shown in FIG. 4, the display panel P1 includes the substrate 10 and the light guide plate 20 pasted to face each other through a liquid crystal layer LQL. The substrate 10 and the light guide plate 20 are arranged in the Z direction that is the thickness direction of the display panel P1. In other words, the substrate 10 and the light guide plate 20 face each other in the thickness direction of the display panel P1 (in the Z direction). In the present embodiment, note that the configuration including the light guide plate 20 also functioning as the counter substrate has been described. However, as shown in FIG. 11, the counter substrate and the light guide plate can be also separated from each other. In other words, the light guide plate 20 may be replaced with the counter substrate 120 shown in FIG. 11, replaced with the cover glass 140 pasted on the counter substrate 120 shown in FIG. 11, or replaced with a stacking structure of the counter substrate 120 and the cover glass 140 shown in FIG. 11. In the light source unit 31 of this case, the light may be made incident on only the side surface of the counter substrate 120, on only the side surface of the cover glass 140, or on both the side surface of the counter substrate 120 and the side surface of the cover glass 140 that are stacked. The following explanation will be made in assumption that the light guide plate 20 is the cover glass 140 pasted on the counter substrate 120 shown in FIG. 11.

The substrate 10 has the front surface (main surface, surface) 10$f$ facing the liquid crystal layer LQL (and the light guide plate 20). The light guide plate 20 has the back surface (main surface, surface) 20$b$ facing the front surface 10$f$ of the substrate 10 (and the liquid crystal layer LQL). The substrate is an array substrate in which a plurality of transistors (transistor elements) functioning as switching elements (active elements) Tr (see FIG. 5) are arranged in array form. The light guide plate 20 is a substrate formed on the display surface side. The light guide plate 20 can be regarded as a counter substrate meaning a substrate facing the array substrate.

The liquid crystal layer LQL containing liquid crystal LQ is between the front surface 10$f$ of the substrate 10 and the back surface 20$b$ of the light guide plate 20. The liquid crystal layer LQL is an optical modulator element. The display panel P1 has a function of modulating light passing therethrough by using the switching element to control a state of electric field formed around the liquid crystal layer LQL. In plan view of this display panel P1, the display regions DA in the substrate 10 and the light guide plate 20 overlap the liquid crystal layer LQL as shown in FIG. 4.

The substrate 10 and the light guide plate 20 are bonded to each other through a sealing portion (sealing member) SLM. As shown in FIGS. 3 and 4, the sealing portion SLM (see FIG. 4) is arranged in the peripheral region PFA to surround the periphery of the display region DA. The liquid crystal layer LQL is inside the sealing portion SLM as shown in FIG. 4. The sealing portion SLM plays a role of a sealing for sealing the liquid crystal into the gap between the substrate 10 and the light guide plate 20. The sealing portion SLM also plays a role of a bonding member for bonding the substrate 10 and the light guide plate 20.

The side light source apparatus 30 includes a plurality of light source units 31. The light source unit 31 is arranged at a position facing a side surface 20$s$ of the light guide plate 20. As schematically illustrated with a dashed double-dotted line in FIG. 4, the light-source light L1 emitted from the light source units 31 propagates to be distant from the side surface 20$s$ while reflecting on the back surface 10$b$ of the substrate 10 and the front surface 20$f$ of the light guide plate 20. In a propagation path of the light-source light L1, the back surface 10$b$ of the substrate 10 and the front surface 20$f$ of the light guide plate 20 are borders between a medium having a large refractive index and a medium having a small refractive index. Therefore, if the incident angle of the light-source light L1 on the front surface 20$f$ and the back surface 10$b$ is larger than an optimum angle, the light-source light L1 totally reflects on the front surface 20$f$ and the back surface 10$b$.

The liquid crystal LQ is polymer dispersed liquid crystal LC, and contains liquid-crystalline polymer and liquid crystal molecules. The liquid-crystalline polymer is formed to have a stripe shape, and the liquid crystal molecules are dispersed to gaps of the liquid-crystalline polymer. Each of the liquid-crystalline polymer and the liquid crystal molecules has optical anisotropy and refractive index anisotropy. Responsiveness of the liquid-crystalline polymer with respect to electric field is lower than responsiveness of the liquid crystal molecules with respect to electric field. A direction of orientation of the liquid-crystalline polymer hardly varies depending on the electric field. On the other hand, a direction of orientation of the liquid crystal molecules varies depending on the electric field when a voltage equal to or higher than a threshold value is applied to the liquid crystal LQ.

When no voltage is applied to the liquid crystal LQ, optical axes of the liquid-crystalline polymer and the liquid crystal molecules are parallel to each other, and therefore, the light-source light L1 having entered the liquid crystal layer LQL is hardly scattered in the liquid crystal layer LQL and penetrates therein (transparent state). When the voltage is applied to the liquid crystal LQ, the optical axes of the liquid-crystalline polymer and the liquid crystal molecules cross each other, and therefore, the light-source light L1 having entered the liquid crystal LQ is scattered in the liquid crystal layer LQL (scattering state).

The transparent state and the scattering state in the display panel P1 are controlled by control for the orientation of the liquid crystal LQ in the propagation path of the light-source light L1. In the scattering state, by the liquid crystal LQ, the light-source light L1 is emitted as emitted light L2 from the front surface 20f to outside of the display panel P1. Background light L3 incident on the back surface 10b penetrates the substrate 10, the liquid crystal layer LQL and the light guide plate 20, and is emitted outward from the front surface 20f. The emitted light L2 and the background light L3 are visually recognized by the observer on the front surface 20f side. The observer can visually recognize combination of the emitted light L2 and the background light L3.

(Configuration Example of Circuit)

Figure 5:
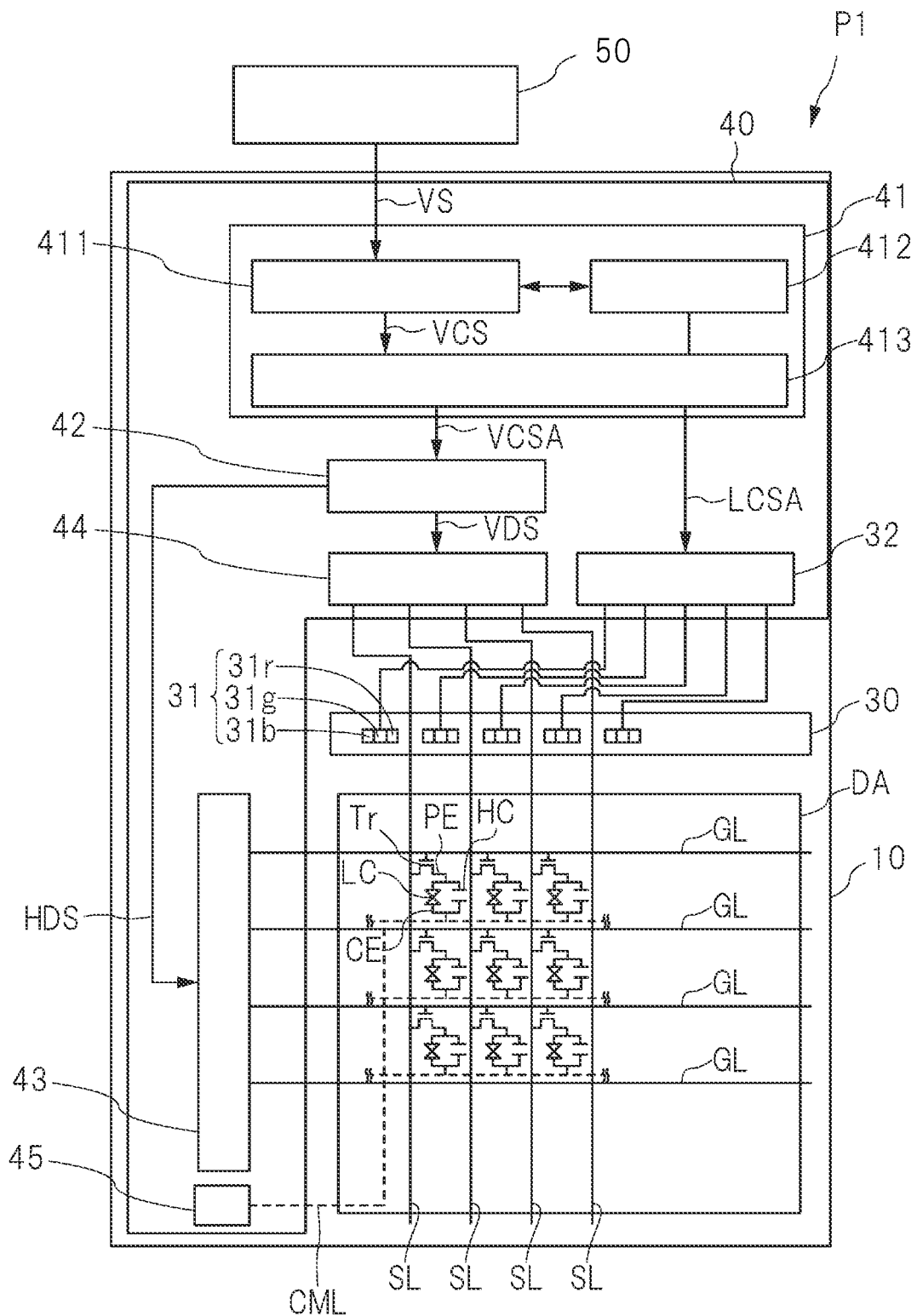
FIG. 5 is a circuit block diagram showing one example of a circuit included in the transparent display panel shown in FIG. 3.

Next, a configuration example of a circuit included in the display panel P1 shown in FIG. 3 will be explained. FIG. 5 is a circuit block diagram showing one example of a circuit included in the transparent display panel shown in FIG. 3. A wiring path connected to a common electrode CE shown in FIG. 5 is formed in, for example, the light guide plate 20 shown in FIG. 4, more specifically, the counter substrate 120 having the configuration shown in FIG. 11. In FIG. 5, the wiring formed in the light guide plate 20 is illustrated with a dotted line. In the example shown in FIG. 5, a light-source controller 32 is included in the driver circuit 40. As a modification example, the light-source controller 32 may be arranged to separate from the driver circuit 40. The light-source controller 32 is formed in, for example, a wiring substrate (not illustrated) connected to the side light source apparatus 30 shown in FIG. 3, and is electrically connected to the light source unit 31 through this wiring substrate.

In the example shown in FIG. 5, the driver circuit 40 includes a signal processor circuit 41, a pixel controller circuit 42, a gate driver circuit 43, a source driver circuit 44 and a common potential driver circuit 45. The light source unit 31 includes, for example, light emitting diode elements 31r, 31g and 31b that are a red-color light source, a green-color light source and a blue-color light source.

The signal processor circuit 41 includes an input signal analyzer (input signal analyzer circuit) 411, a storage (storage circuit) 412 and a signal adjuster 413. The display panel P1 includes a controller 50 including a controller circuit for controlling image display, and an input signal VS is input from the controller 50 to the input signal analyzer 411 of the signal processor circuit 41 through a wiring path such as a flexible wiring board not illustrated. The input signal analyzer 411 performs analysis processing based on the input signal VS input from outside, and creates an input signal VCS. The input signal VCS is a signal for determining, for example, what gradient value is to be input to each pixel PIX (see FIG. 3) of the display panel P1, based on the input signal VS.

The signal adjuster 413 creates an input signal VCSA from the input signal VCS input from the input signal analyzer 411. The signal adjuster 413 transmits the input signal VCSA to the pixel controller circuit 42, and transmits a light source control signal LCSA to the light source controller 32. The light source control signal LCSA is a signal containing, for example, information of light quantity of the light source unit 31 set in accordance with the gradient value input to the pixel PIX. For example, for display of the dark image, the light quantity of the light source unit 31 is set to small. For display of the bright image, the light quantity of the light source unit 31 is set to large.

The pixel controller circuit 42 creates a horizontal driving signal HDS and a vertical driving signal VDS based on the input signal VCSA. For example, the present embodiment adopts driving in a field sequential system, and therefore, the horizontal driving signal HDS and the vertical driving signal VDS are created for each color that can be emitted from the light source unit 31. The gate driver circuit 43 sequentially selects the gate line GL of the display panel P1 (see FIG. 3) within one vertical scanning period, based on the horizontal driving signal HDS. An order of the selection of the gate line GL is optional. As shown in FIG. 3, a plurality of gate lines (signal wirings) GL extend in the X direction, and are arranged side by side in the Y direction.

To each source line SL of the display panel P1, the source driver circuit 44 supplies a gradient signal depending on the output gradient value of each pixel PIX (see FIG. 3) within one horizontal scanning period, based on the vertical driving signal VDS. As shown in FIG. 3, a plurality of source lines (signal wirings) SL extend in the Y direction, and are arranged side by side in the X direction. One pixel PIX is formed at each cross section between the gate line GL and the source line SL. At each cross section between the gate line GL and the source line SL, the switching element Tr (see FIG. 5) is formed. A plurality of the gate lines GL and a plurality of the source lines SL shown in FIGS. 3 and 5 correspond to a plurality of signal wirings transmitting the driving signals for driving the liquid crystal LQ shown in the drawings.

For example, a thin-film transistor is used as the switching element Tr shown in FIG. 5. The type of the thin-film transistor is not limited to any particular type, and, for example, the followings are exemplified: In classification based on a gate position, a bottom-gate transistor and a top-gate transistor are exemplified. Also, in classification based on the number of gates, a single-gate thin-film transistor and a double-gate thin-film transistor are exemplified. One of a source electrode and a drain electrode of the switching element Tr is connected to the source line SL, a gate electrode is connected to the gate line GL, and the other of the source electrode and the drain electrode is connected to one end of a capacitor of the polymer diffused liquid crystal LC (the liquid crystal LQ shown in FIG. 4). One end of the capacitor of the polymer diffused liquid crystal LC is connected to the switching element Tr though a pixel electrode PE, and the other end is connected to a common potential wiring CML through the common electrode CE. A holding capacitor HC is generated between the pixel electrode PE and a holding capacitor electrode electrically connected to the common potential wiring CML. Note that the common potential wiring CML is supplied by the common potential driver circuit 45.

(Arrangement Configuration of Light Source Unit)

Next, an arrangement relation of the light source unit 31 included in the side light source apparatus 30 of the display panel P1 shown in FIG. 3 will be explained.

Normally, a plurality of the light source units 31 are arranged along a longitudinal direction (first direction) of the side light source apparatus 30. It can be also said that the plurality of the light source units 31 are arranged to face the side surface 20s of the light guide plate 20. Note that the light source unit 31 is made of, for example, light emitting diode elements 31r, 31g and 31b as shown in FIG. 5.

Figure 6A:
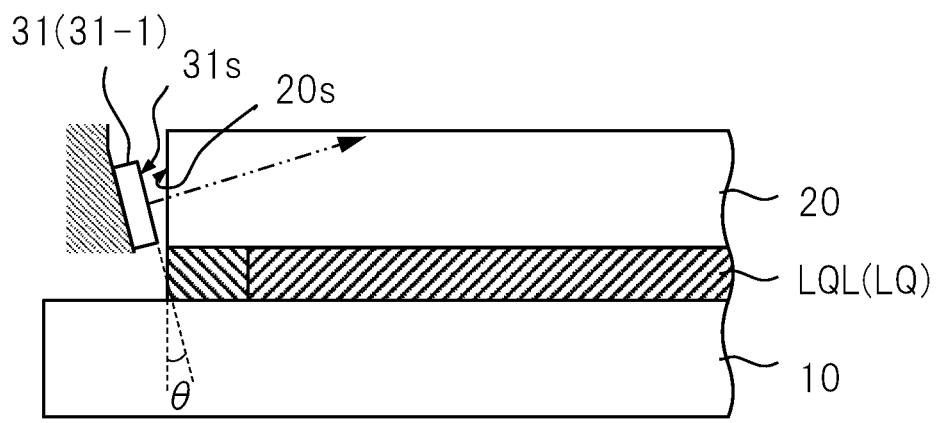
FIG. 6A is a diagram for explaining an arrangement relation of a light source unit with respect to a light guide plate in side view of the transparent display panel shown in FIG. 3.
Figure 6B:
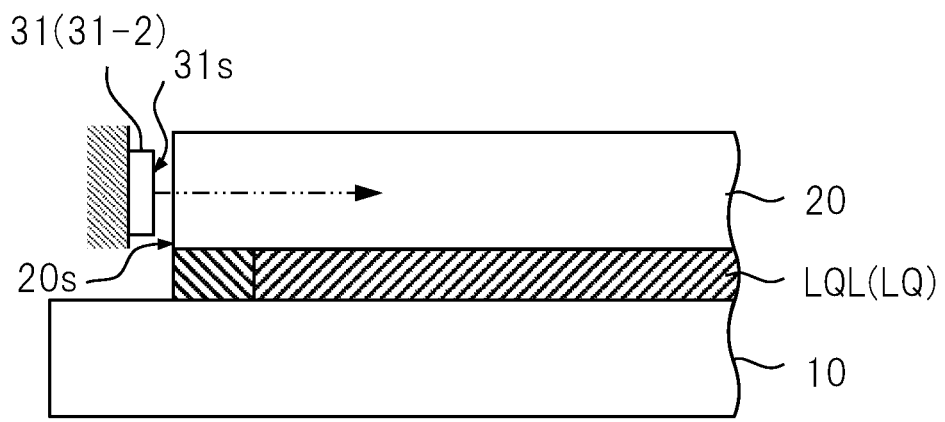
FIG. 6B is a diagram for explaining an arrangement relation of a light source unit with respect to a light guide plate in side view of the transparent display panel shown in FIG. 3.
Figure 6C:
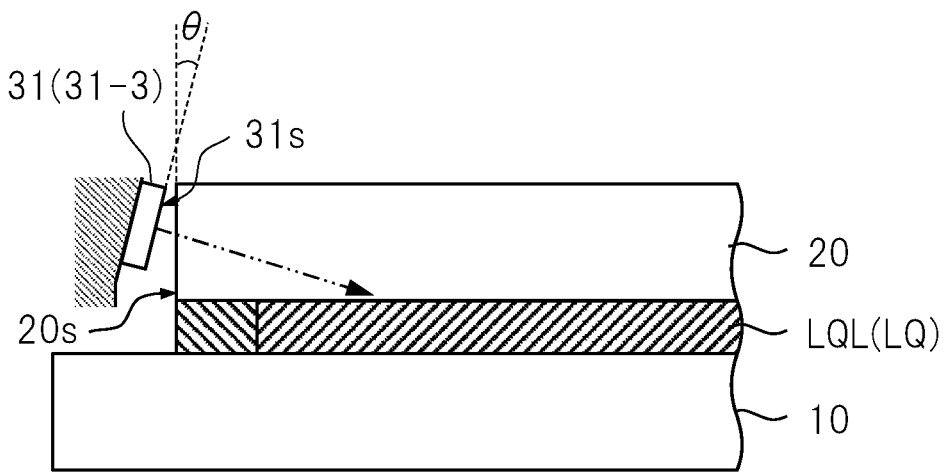
FIG. 6C is a diagram for explaining an arrangement relation of a light source unit with respect to a light guide plate in side view of the transparent display panel shown in FIG. 3.

FIGS. 6A to 6C are diagrams each for explaining the arrangement relation between the light guide plate 20 and the light source unit 31. This drawing shows a side view of the display panel P1 in a state in which the substrate 10 configuring the display panel P1 is arranged on the lower side while the light guide plate 20 is arranged on the upper side. In such view, examples of a light emitting surface 31s of the light source unit 31 with respect to the side surface 20s of the light guide plate are a case of a light source unit 31-1 arranged to face upward as shown in FIG. 6A, a case of a light source unit 31-2 arranged in parallel as shown in FIG. 6B, and a case of a light source unit 31-3 arranged to face downward as shown in FIG. 6C.

When the direction of the light emitting surface of the light source unit 31 with respect to the side surface of the light guide plate 20 is made different as described above, the incident angle of the light-source light L1 on the side surface 20s (incident light surface) of the light guide plate 20 can be also made different. In this manner, the bias of the angle distribution of the light (particularly light in the region near the incident-light portion) guided in the light guide plate 20 can be reduced, and the formation of the dark line or the bright line can be suppressed.

Regarding the arrangement of the light source units 31 of the side light source apparatus 30, it is preferable to use at least two types of the light source units 31 having the different directions shown in FIGS. 6A to 6C. More specifically, if two types of the light emitting elements having the different directions are used as the light source units 31, a configuration including the upward-facing light source unit 31-1 and the parallel light source unit 31-2, a configuration including the upward-facing light source unit 31-1 and the downward-facing light source unit 31-3, and a configuration including the parallel light source unit 31-2 and the downward-facing light source unit 31-3 can be exemplified. If the three types are used, a configuration including the upward-facing light source unit 31-1, the parallel light source unit 31-2 and the downward-facing light source unit 31-3 can be exemplified.

The present embodiment may be configured to include the light source units 31 having the different directions as described above, and a ratio and a pattern of the arrangement may be configured to reduce the bias of the angle distribution of the light guided in the light guide plate 20, and are not particularly limited.

In order to provide the favorable effect for reducing the bias of the angle distribution, note that the ratio in the case of the usage of the two-type light source units having the different directions is preferably 3:7 to 7:3, more preferably 4:6 to 6:4, still more preferably 5:5. The ratio in the case of the usage of the three-type light source units having the different directions is preferably, for example, 1:1:1, 1:1:2, 1:2:2 or others (in optional directions).

Figure 7:
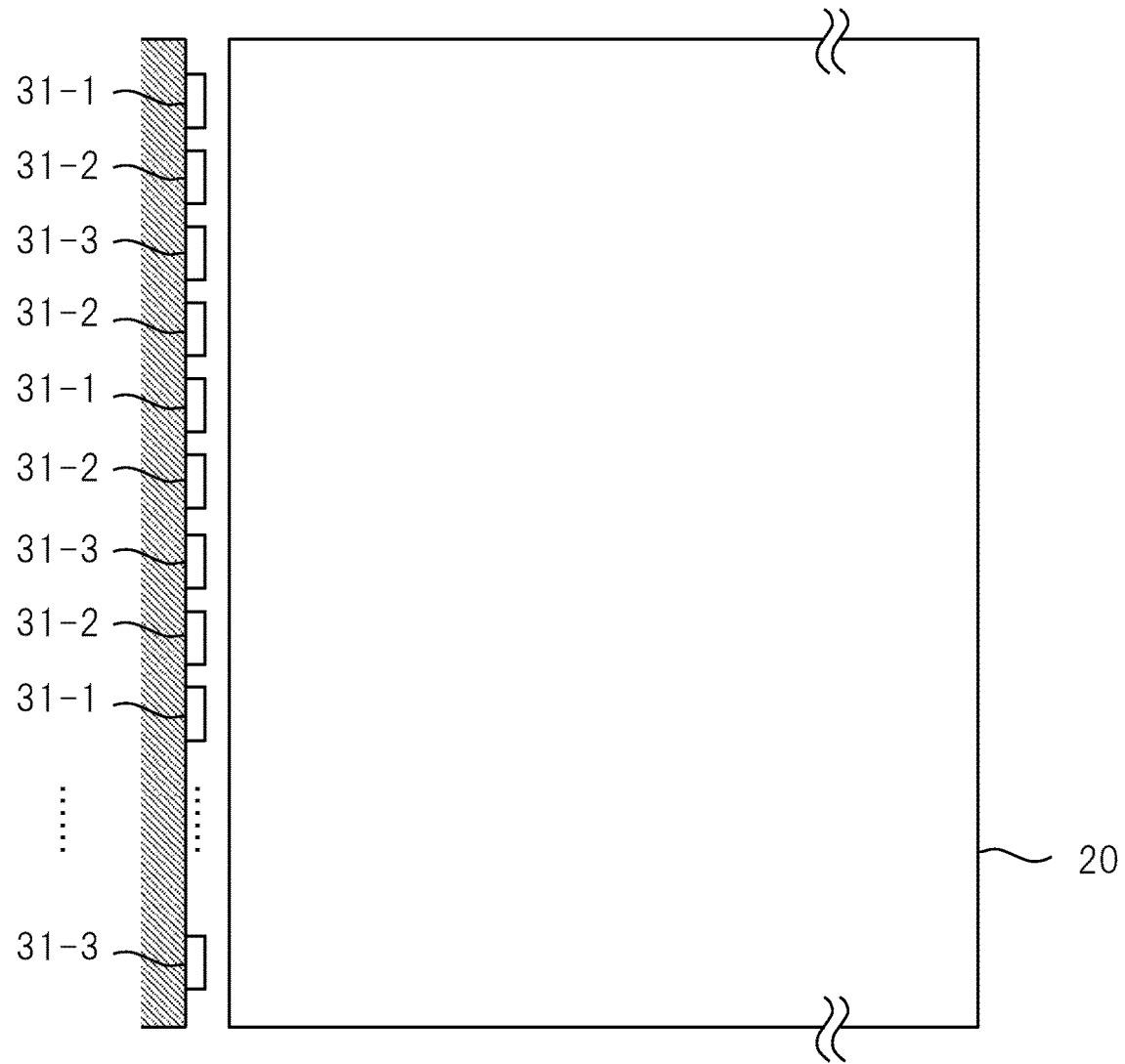
FIG. 7 is a diagram showing one example of the arrangement relation of the light source unit with respect to the light guide plate in plan view of the transparent display panel shown in FIG. 3.

In the light source units having the different directions, note that the different directions are preferably regularly arranged (in the following explanation, the upward-facing light source unit is abbreviated as "upward", the parallel light source unit is abbreviated as "parallel", and the downward-facing light source unit is abbreviated as "downward"). As examples of the regular arrangement, a case (1) representing upward, downward, upward, downward, upward, downward . . . , a case (2) representing upward, parallel, upward, parallel, upward, parallel . . . , a case (3) representing downward, parallel, downward, parallel, downward, parallel, . . . , a case (4) representing upward, parallel, downward, parallel, upward, parallel, downward, parallel, upward . . . , a case (5) representing upward, parallel, downward, upward, parallel, downward, upward, parallel, downward . . . , and others can be exemplified. FIG. 7 shows the configuration of the arrangement position in the arrangement of the light source units 31 in the case (4) in plan view from the light guide plate 20.

An angle θ made by the light emitting surface 31s of the upward-facing light source unit 31-1 and the side surface 20s of the light guide plate 20 is preferably 5 to 20 degrees, more preferably 5 to 15 degrees, still more preferably 5 to 10 degrees. The upward-facing light source units 31-1 may be mixed to make this angle θ different.

Similarly, an angle θ made by the light emitting surface 31s of the downward-facing light source unit 31-3 and the side surface 20s of the light guide plate 20 is preferably 5 to 20 degrees, more preferably 5 to 15 degrees, still more preferably to 10 degrees. The downward-facing light source units 31-3 may be mixed to make this angle θ different.

The made angles of the upward-facing light source unit 31-1 and the downward-facing light source unit 31-3 can be optionally made. However, the light source units having the same angle but the different directions are preferably arranged at about the same ratio.

Note that the made angle of the parallel light source unit 31-2 is not described. However, this angle is zero since the light emitting surface 31s and the side surface 20s of the light guide plate 20 are parallel to each other. In the present embodiment, also in consideration of occurrence of manufacture errors, the made angle of the parallel-arranged light source unit 31-2 can also include a case of an angle that is equal to or smaller than 5 degrees.

Figure 9:
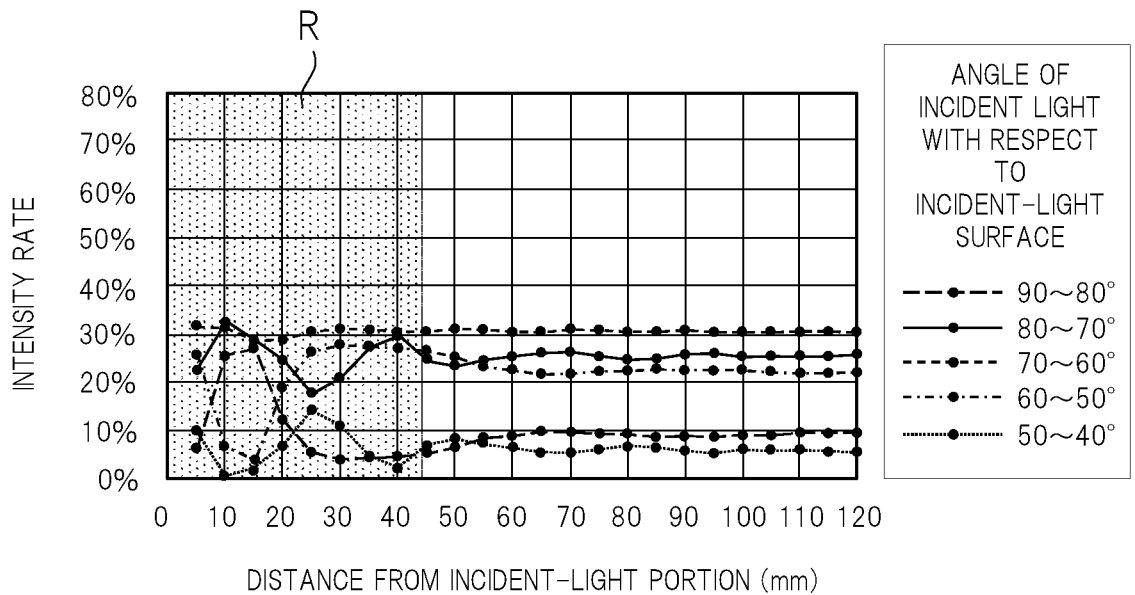
FIG. 9 is a graph showing an angle distribution of incident light on the light guide plate from an LED in the present embodiment.

Note that FIG. 9 shows a result of the angle distribution of the incident light on the light guide plate 20 studied through the simulation under the same conditions as those of the studied matters except in that a light source unit 150 is used as the light source unit 31 and in that the light emitting surface 31s is arranged to have a specific direction. Note that the light emitting surface 31s of the light source unit 31 is configured so that the numbers of the three-type directions that are the upward direction (the angle θ=10 degrees), the parallel direction and the downward direction (the angle θ=10 degrees) are set to the same as one another and so that the order of the arrangement is made as shown in FIG. 7 to be the case (5) regarding upward, parallel, downward, upward, parallel, downward, upward, parallel, downward . . . .

As shown in FIG. 9, it has been found out that the bias of the angle distribution of the incident light on the region near the incident-light portion of the light guide plate can be reduced when the light source units having the three-type directions are used while these light sources are regularly arranged. Incidentally, the intensity rate of the light having an incident angle that is equal to or smaller than 40 degrees is about equal to or lower than 5% that is small even in the region near the incident-light portion, and therefore, the description thereof is omitted. In other words, it is considerable that such a configuration can suppress the formation of the dark line or the bright line in the region near the incident-light portion of the display apparatus.

Modification Example

Figure 8:
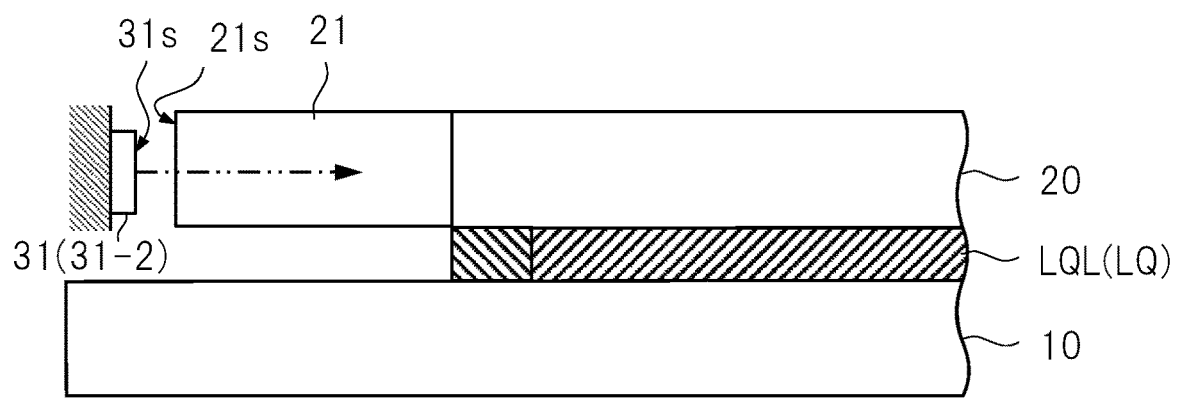
FIG. 8 is a cross-sectional view showing a configurational example provided when a lens as the light guide plate is arranged on the light source unit side.

Note that the light guide plate 20 may be provided with a lens unit 21 as a part of the light guide plate on the light source unit side (incident light side) as shown in FIG. 8. In this case, the lens unit 21 has a side surface 21s facing the light source unit 31, a side surface opposite to this side surface 21s is arranged to be in contact with the light guide plate 20 so that the light-source light emitted from the light source unit 31 is guided to the light guide plate 20 through the lens unit 21.

This lens unit 21 can be also made of a plurality of lenses arranged in the X direction, or made of one lens extending in the X direction. The lens is an optical member having a function of scattering or converging the light by using the difference of the refractive index among the light guiding members transmitting the visible light. This lens unit 21 functions as one type of the light guide plate, and combination of the light guide plate 20 and the lens unit 21 configures the light guide plate in the present modification example.

Therefore, in the display panel having the configuration shown in FIG. 8, the arrangement relation between the lens unit 21 and the light source units 31 is set to the same as the relation between the light guide plate 20 and the light source unit 31 explained in FIGS. 6 and 7. In other words, the relation between the side surface 21s and the light emitting surface 31s of the light source unit 31 may be configured to a predetermined arrangement relation while regarding the side surface 20s of the light guide plate 20 as the side surface 21s of the lens unit 21 in FIGS. 6 and 7.

When the light emitting surface 31s of the light source unit 31 and the side surface 20s of the light guide plate 20 are arranged to have a predetermined angle or mixed angles as explained in the embodiments and modification examples, the variation of the angle distribution of the incident light on the region near the incident-light portion of the light guide plate can be reduced, and, as a result, the formation of the dark line or the bright line in the region near the incident-light portion can be suppressed.

The present embodiments can provide the above-described effect while using the related-art material as it is except for the adjustment of the attachment angle of the light source unit without the specific process such as the formation of the concave portion or the convex portion on the side surface of the light guide plate as described in the publicly-known Document 1, and can also suppress the manufacturing cost.

In the foregoing, the embodiments and the typical modification examples have been explained. However, the above-described technique is applicable to not only the exemplified modification examples but also various modification examples. For example, the above-described modification examples may be combined.

In the scope of the idea of the present invention, various modification examples and alteration examples could have been easily anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

The present invention is applicable to a display apparatus and an electronic apparatus in which the display apparatus is embedded.

The invention claimed is:

1. A display apparatus comprising:
a first substrate having a first front surface and a first back surface that is an opposite surface of the first front surface;
a liquid crystal layer arranged on the first front surface of the first substrate;
a light guide plate having a first main surface facing the first front surface, a second main surface that is an opposite surface of the first main surface and a side surface crossing the first main surface and the second main surface; and
a light source unit including a plurality of light emitting elements arranged one by one along a first direction perpendicular to a thickness direction of the light guide plate, at a position facing the side surface of the light guide plate,
wherein a light emitting surface of the light source unit is arranged to have a different direction from a direction of the side surface of the light guide plate in the thickness direction of the light guide plate,
the plurality of light emitting elements include a first light emitting element and a second light emitting element adjacent to the first light emitting element and arranged in the first direction, each respectively including first light emitting surface emitting light to the side surface and second light emitting surface emitting light to the side surface of the light guide plate, and
the first emitting surface is not parallel to the second emitting surface.

2. The display apparatus according to claim 1, wherein, in side view of a state in which the first substrate is arranged on a lower side while the light guide plate is arranged on an upper side, the light emitting surface of the light source unit is arranged to have two or more different directions selected from a parallel direction, an upward direction and a downward direction, from the direction of the side surface of the light guide plate.

3. The display apparatus according to claim 2, wherein, in side view of the state in which the first substrate is arranged on the lower side while the light guide plate is arranged on the upper side, the light emitting surface of the light source unit is arranged to have three different directions that are the parallel direction, the upward direction and the downward direction, from the direction of the side surface of the light guide plate.

4. The display apparatus according to claim 2, wherein, in side view of the state in which the first substrate is arranged on the lower side while the light guide plate is arranged on the upper side, the light emitting surface of the light source unit includes the light emitting elements arranged in the different directions from the direction of the side surface of the light guide plate and sequentially regularly arranged.

5. The display apparatus according to claim 3, wherein, in side view of the state in which the first substrate is arranged on the lower side while the light guide plate is arranged on the upper side, the light emitting surface of the light source unit includes the light emitting elements arranged in the three different directions from the direction of the side surface of the light guide plate and sequentially regularly arranged.

6. The display apparatus according to claim 2, wherein an angle made by the side surface of the light guide plate and at least one of the light emitting surfaces of the light source unit arranged in the upward direction and the downward direction is 5 to 20 degrees.

7. The display apparatus according to claim 1, wherein the light guide plate includes a lens unit on the light source unit side.

8. The display apparatus according to claim 1, wherein the plurality of light emitting elements further includes a third light emitting element adjacent to the second light emitting element in the first direction, and the first light emitting surface of the first light emitting element is tilted in an upward direction with respect to the side surface, the second light emitting surface of the second light emitting element is parallel to the side surface of the light guide plate, and a third light emitting surface of the third light emitting element is in a downward direction with respect to the side surface.

9. A display apparatus comprising:
a first substrate having a first front surface and a first back surface that is an opposite surface of the first front surface;
a liquid crystal layer arranged on the first front surface of the first substrate;
a light guide plate having a first main surface facing the first front surface, a second main surface that is an opposite surface of the first main surface and a side surface crossing the first main surface and the second main surface; and
a light source unit including a plurality of light emitting elements arranged along a first direction perpendicular to a thickness direction of the light guide plate, at a position facing the side surface of the light guide plate,
wherein the plurality of light emitting elements does not overlap each other in the thickness direction of the light guide plate,
each of plurality of light emitting elements has a single flat light emitting surface, and
the single flat light emitting surface of one of the plurality of light emitting elements is not parallel to another single flat light emitting surface of another one of the plurality of light emitting elements adjacent to the one of the plurality of light emitting surfaces in the first direction.

* * * * *